United States Patent Office 2,933,550
Patented Apr. 19, 1960

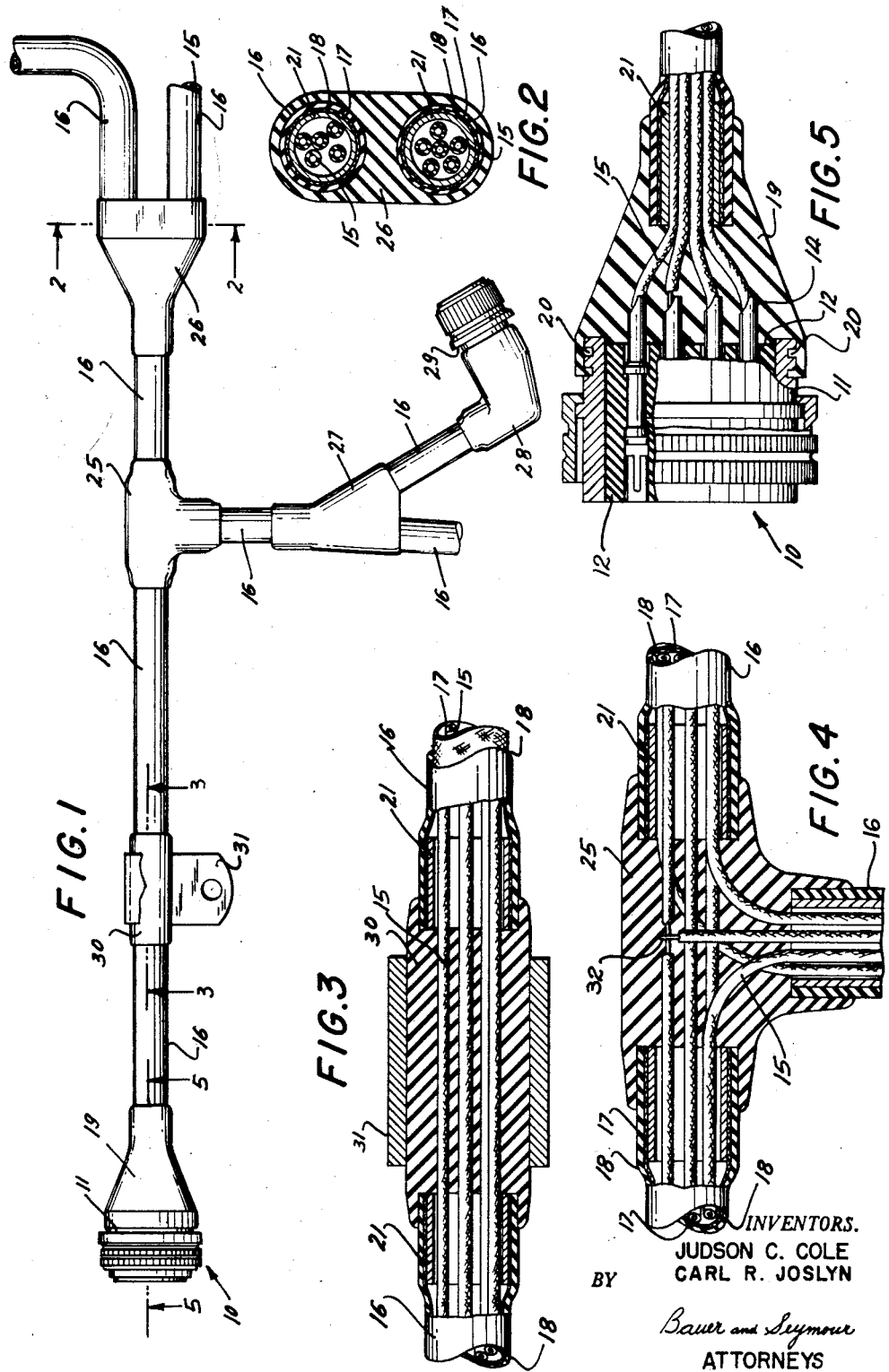

2,933,550

ELECTRICAL WIRING HARNESS

Judson C. Cole and Carl R. Joslyn, Sidney, N.Y., assignors to Bendix Aviation Corporation, Sidney, N.Y., a corporation of Delaware Application March 30, 1956, Serial No. 575,137

18 Claims. (Cl. 174—76)

This invention relates to electrical apparatus and more particularly to structures known in the art as wiring harnesses.

One of the objects of the present invention is to provide a novel electrical wiring harness which is so constructed that electrical conductors may be laid out in substantially any desired pattern and advantageously enclosed for protection and other purposes.

Another object of the invention is to provide a novelly constructed wiring harness which has the advantage of excellent flexibility and other attributes which render it adaptable to a wide field of uses.

Another object is to provide a novel method of fabricating a wiring harness whereby the most complicated wiring arrangements may be enclosed inexpensively and with utmost facility.

Still another object of the invention is to provide apparatus of the above type wherein the enclosure functions in a novel manner to bind a plurality of flexible conductors together at intervals to give stability of form to an otherwise flexible construction.

A further object is to provide novel means for physically connecting one or more tubes or conduits to each other or to a rigid fitting while embedding conductors extending from one to the other.

A still further object is to provide an electrical wiring harness wherein the enclosure for the wiring is novelly divided into compartments sealed from one another, thereby preventing any undesired conditions which may occur in one compartment from adversely affecting the wiring in other compartments or in the entire harness.

Other objects of the invention are to provide a novelly constructed wiring harness which will withstand relatively high as well as relatively low temperatures, is of light weight and adapted for installation in a minimum of space, and is substantially sealed against moisture, dust, oils, greases, gases and the like.

A further object is to provide a wiring harness which is so novelly constructed as to render the same easy to install and to remove from spaces and environments in which prior known harnesses could not be accommodated.

The foregoing objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views:

Fig. 1 is a plan view partly in section and with parts broken away showing one form of electrical wiring harness embodying the invention;

Fig. 2 is a vertical transverse section taken substantially on line 2—2 of Fig. 1;

Fig. 3 is a vertical longitudinal section taken substantially on line 3—3 of Fig. 1;

Fig. 4 is a horizontal longitudinal section through the T-joint 25 of the wiring harness of Fig. 1; and, Fig. 5 is a vertical section taken substantially on line 5—5 of Fig. 1.

A single embodiment of the invention is illustrated in the drawings, by way of example, in the form of a representative portion of a wiring harness adapted for use in control and lighting circuits, ignition systems and the like wherein a plurality of insulated conductors have a common source terminal in a suitable fitting and branch out to a plurality of separated end or use terminals at suitable fittings or the like. However, as will more fully appear hereinafter, the invention is not limited to these specific uses or to the specific construction illustrated in the drawings.

The partial wiring harness shown in Fig. 1 of the drawings comprises a separable or one-half-portion of a plug and socket type connector which may be of any suitable known construction. As an example, either the pin contact or socket contact half of the connector illustrated in Uline et al. U.S. Patent No. 2,563,762 may be used. As shown in Fig. 5, the connector half includes a tubular metallic shell 11 in which is mounted in any suitable manner a contact supporting insert 12 which may, but need not necessarily be, made of resilient insulating material. A plurality of pin or socket contacts 14 of any well known construction extend through insert 12 and each has connected thereto, by means of soldering, crimping or other known means, the end of an insulated conductor 15 from which the insulation has been removed.

Novel means are contemplated by this invention for enclosing and protecting the insulated conductors 15 which emerge from the contacts of connector 10. Said means advantageously performs a multiplicity of functions which will hereinafter appear as the various detail features and portions of the structure are described. For example, the novel construction contemplated not only seals the conductors and the connectors thereof to other parts within an extremely flexible enclosure, but serves also to effectively bind or tie the bundle of conductors together at intervals to provide a wiring harness unit of stable form while preserving maximum flexibility and dividing the enclosure into a plurality of separate and independent cells. The novel construction affords the advantage that the conductors may be laid out and connected in any of a myriad of different patterns and thereafter enclosed and sealed in a moisture-proof and dust-proof manner. The construction may take many different shapes and utilize many types of terminals or end fittings.

The novel enclosure means for the conductors 15 comprises a plurality of enclosure conduits, such as the flexible collapsible tubing 16 which is preferably of light weight, moisture-proof, resistant to high temperatures and resistant to the attack of oils, greases and the like. One form of tubing which has been successfully employed comprises a tube 17 of woven fiber glass impregnated or coated such as by dipping, with a leyr 18 of solid, preferably rubbery, material, a suitable composition for which will be hereinafter more fully described. This provides a strong and flexible covering which may also be readily compressed or shortened accordion fashion in an axial direction along the bundle of conductors to facilitate assembly of the complete harness unit. In some embodiments, successful use has been made of single layer extruded vinyl tubing or the like. The tubing 16 may be made of any materials suitable to the particular use to which the ultimate structure is to be put and may in some instances be rigid or semi-rigid.

A novel connection between tube 16 and connector shell 11 is afforded by a mass 19 of insulating material which is preferably resilient and may be molded into place after the assembly of the connector parts and connection of the conductors 15 to contacts 14. A sectional mold and well known molding technique may be used. One end of molded mass 19 surrounds and preferably adheres to the end of connector shell 11, adherence being assured by the application of a suitable primer to the shell in a manner hereinafter described. If a sturdier connection or a connection without adherence is required or desired, the surface of the shell may be roughened, threaded, grooved or the like, two annular grooves 20 being shown in the illustrated embodiment for this purpose. The other end of molded mass 19 adheres to the outer surface of the end portion of tubing 16. To insure a good joint the materials of the mass and the tube must be compatible and of such a nature that they will bond to one another. A good joint may generally be effected by using the same or similar plastic or thermoplastic materials for both the tubes 16 and the mass 19. For example, a plastisol compound which is a vinyl dispersion in a plasticizer may be used as a coating on the tubes 16 and also as material for the molded mass 19. Thermosetting materials, such as silicone rubbers and the like may also be used where high temperature resistance is important and polyethylene and equivalent compounds may be used where high temperatures are not encountered.

A suitable plastisol composition for the molded mass 19 has been produced with a mixture of 100 parts by weight of a powdered polyvinyl chloride known commercially as B. F. Goodrich Chemical Company Geon paste resin #12, 43.4 parts and 20 parts, respectively, of Rohm & Haas Company Paraplex G–50 and Paraplex G–60, which are polyesters and serve as high temperature resistant plasticizers, and 17.5 parts of a stabilizer which may be pigmented. A suitable stabilizer for this purpose may consist of a mixture of 56.93 parts by weight of Dythal (di-basic lead phthalate), 37.95 parts of Paraplex G–50 (polyester plasticizer) and a pigment such as Caddy red toner R–6222. This latter mixture when milled forms a very fine dispersion of di-basic lead phthalate and pigment in Paraplex G–50 in the form of a mobile paste. All of the above ingredients of the plastisol compound are preferably carefully mixed together until the powdered polyvinyl chloride is sufficiently wet to prevent dusting and then mixed under vacuum to de-aerate the same by means, such as a Hobart mixer, capable of producing moderately high shear in the compound to insure adequate dispersal of the vinyl resin powder in the liquid plasticizer system.

In order to provide a good connection and a suitable joint between the plastisol or similar mass 19 and the normally collapsible tube 16, a short, relatively rigid adaptor tube 21 is inserted in the end portion of tube 16 which extends into and is gripped by the mold into which the compound for forming mass 19 is injected. The adaptor 21 may be of light weight material, such as paper or cardboard, and may serve also to prevent relative flexing of the tubing 16 and the mass 19 at the joint thereof. Such flexing would tend to destroy the bond between these two elements.

It will be understood that the connector 10 is exemplary only of many types of fittings which may be similarly connected with the flexible tube 16 in the manner herein described. The shell 11 or any similar fitting is preferably prepared as pointed out above by applying a suitable primer to the surfaces thereof to which adhesion of the molded mass 19 is desired. When the mass consists of a plastisol of the composition above described, the shell surfaces are first cleaned with tri-chloroethane or its equivalent and a thin coating of metal primer, such as that known commercially as United Chromium, Inc. Unichrome primer #219–PX or its equivalent. When this initial primer coat is dry, there is preferably applied a second thin coat of a special mixture comprising 57.15 parts by weight of cyclohexanone, 14.25 parts of plastisol compound above described, and 28.56 parts of the Unichrome primer above mentioned, care being used not to disturb the initial primer coat. The dual coated part or fixture is then baked for approximately an hour at 350° F. either in an oven or in the mold before the injection of the plastisol compound.

In some instances there may be some openings or passages in communication with the interior of the mold when the sections thereof are clamped in place ready for the injection of plastisol or similar compound. If these openings are small, the same may be pre-sealed with the plastisol compound which should be baked prior to the application of the molds or at least prior to the injection of the additional compound. If the openings are large, flow of the injected compound therethrough may be blocked off by the use of a suitable adhesive tape or the like. Before the mold sections are put in place the primed surfaces of the shell or other fittings and the surface of the tube 16 to which the mass 19 is required to adhere should be cleaned, such as with tri-chloro-ethane or its equivalent.

After the mold sections are clamped or otherwise securely fastened in place, it may be preferable, particularly if the units contain molded plastic parts, to pre-head the molds and parts by applying sufficient heat to raise the mold temperature to approximately the curing temperature of the compound which is to be injected. When molded plastic parts are incorporated in the structure, this temperature should be maintained for approximately a half hour before injecting the molding compound for the purpose of driving out the air so that the latter will not invade the injected compound at the curing temperature. The de-aerated plastisol compound is then injected or poured into the mold until the latter is completely filled. Although in the interest of clarity it is not so shown, some of the injected compound may flow into the conduits 16, 21 around the conductors 15 but this may be prevented, if desired, in the manner above described or by suitably filling the spaces in tubes 21 around the conductors before placing the mold sections in position. A temperature of approximately 350° F. in the case of the plastisol compound above described is then maintained until the compound is cured, the time being dependent upon the size of the mold. The mold should be cooled to about 140° F. or less before releasing the clamping pressure.

In some installations it may be desirable to use cables 15 which are insulated with a material which will bond with the material forming the molded mass embedding the same. Likewise it may be desirable that the molded mass 19 adhere to the end surface of connector insert 12 to provide assurance against electrical flashovers. The material of the molded mass will also flow into and fill any cavities in the insert around the ends of contacts 14. Depending upon the materials used, it may sometimes be desirable or necessary to apply suitable primers to the surfaces of tubes 16, conductors 15 and insert 12 to effect bonds with the molded masses.

When it is desired to splice two sections of tubing 16 together, the ends thereof are first cleaned and then overlapped about a half inch by telescoping the same, preferably about an adaptor tube 21. A strip of cured plastisol compound may then be wrapped about the end of the outer lap and heated in a suitable fixture, if desired, to fuse the same to the tubing at each side of the lap joint.

Where the conductors branch out into three or more branches, the adjacent ends of the tubes 16 are brought as closely together as possible, fitted with adaptor tubes 21, cleaned in a manner above described, and connected together in a novel manner by a molded mass of a suitable compound, such as the plastisol compound above described. Several such joints are illustrated as being formed by the masses 25, 26 and 27. Sectional molds of suitable design may be used to form the last mentioned masses in the manner described above in the molding of mass 19.

As will be seen from the sectional view of Fig. 4, the plastisol compound 25 fills the space between and around conductors 15 and secures or ties the same together against relative movement. Additionally, the mass 25 as well as the masses 19, 26 and 27 seal off the adjacent ends of the sections of tubing 16 and the fitting or shell 11 and thereby prevent pressures, gases, moisture or the like in one section, which may become defective, from penetrating the entire wiring harness. These tube joining masses serve also to impart a relatively stable form to the entire harness and a mass, such as mass 19, at a fitting or connector shell serves to replace the cable clamp heretofore used to prevent, among other things, damage to the connections between conductors 15 and contacts 14 which has heretofore resulted from pulling bending forces, vibrations and the like. A further example of a fitting being connected to tubing 16 is shown in Fig. 1 where a molded mass 28 in the shape of an elbow joins a fitting or connector shell 29 to tubing 16 around the conductors extending therebetween.

The invention also contemplates novel means for providing a support section in a wiring harness of the above type to permit mounting thereof in a wall or on a supporting structure by means of clamps, brackets, or the like. This may be accomplished in a novel manner, as best seen in Fig. 3, by removing a section of tubing 16, fitting the adjacent ends with adaptor tubes 21 and molding a mass 30 of plastisol or similar compound, around conductors 15 and the end portions of the sections of tubing 16 in the manner above described. The solid, resilient mass 30 embedding conductors 15 and adhering to tubes 16, will then serve as an excellent base for a clamp or bracket 31 of known construction or the like. The masses 25, 26 and 27 may also be used as mounting points.

Although only a single embodiment of the invention has been illustrated in the accompanying drawing and described in detail in the foregoing specification, it will be expressly understood that the invention is not limited thereto. For example, the insulated conductors 15 may be covered with metallic braid for radio shielding purposes or the like, and if desired, conductors may be spliced or electrically connected with one another within the molded connecting masses, such as in mass 25. In the latter case the single conductors with the insulation removed from the ends thereof may be electrically connected or a conductor from one branch may be connected to a conductor extending into two other branches, as illustrated at 32. If there are several such splices or connections of this type at a single joint, it may be desirable to tape or otherwise somewhat insulate the connection before the connecting mass is molded into place. Additionally, it is not essential that all or any of the tubing 16 be flexible in some embodiments of the invention. Various other changes, such as in the kind and nature of the materials and the proportions of ingredients suggested and the shape of the tube-joining masses, as well as in the arrangement of the parts illustrated, may also be made without departing from the spirit and scope of the invention as the same will now be understood by those skilled in the art.

What is claimed is:

1. An electrical wiring assembly comprising one or more electrical conductors, a plurality of flexible collapsible sleeves loosely surrounding portions of said conductors, the adjacent ends of said sleeves being in spaced relation, means only in the end portion of each of said sleeves to extend said end to its normal internal diameter and radially support the same, and a solidified unitary mass surrounding and adhering to the supported end portions of said sleeves and embedding the portions of said conductors between said sleeves.

2. An electrical wiring assembly as defined in claim 1 wherein said supporting means for the end portions of the sleeves are paper tubes.

3. An electrical wiring assembly as defined in claim 1 wherein each of said sleeves comprises a woven fiber glass tube coated with a solidified plastic material, such as plastisol.

4. An electrical wiring assembly as defined in claim 1 wherein there are at least three of said sleeves connected by said mass.

5. An electrical wiring assembly comprising at least one insulated electrical conductor, spaced flexible and readily collapsible sleeves loosely surrounding portions of said conductor, means around the conductor and only in the ends of said sleeves to radially internally support the same, and a solid self-sustaining molded mass embedding the insulated conductor between the adjacent ends of said sleeves and surrounding the supported end portions of said sleeves.

6. A wiring assembly as defined in claim 5 wherein said mass adheres to the outer surfaces of and seals the supported end portions of both of said sleeves.

7. A wiring assembly as defined in claim 5 wherein at least one of said sleeves is a rigid metallic sleeve, such as a connector shell.

8. A wiring assembly as defined in claim 7 comprising a coating on the end portion of said metallic sleeve, said mass adhering to said coating.

9. A wiring assembly as defined in claim 8 wherein said coating includes a metal primer and a quantity of a plastic composition to which the composition of said mass will bond.

10. A wiring assembly as defined in claim 8 wherein said coating comprises a first layer consisting of a metal primer and a second layer of a mixture comprising a metal primer and a quantity of the same composition as said mass.

11. A wiring assembly as defined in claim 5 wherein said flexible sleeve comprises an outer wall portion of plastic material, such as plastisol.

12. A wiring assembly as defined in claim 5 wherein said flexible sleeve comprises an inner wall portion of woven material, such as fiber glass, and an outer surface of plastic material, such as plastisol.

13. A wiring assembly as defined in claim 5 wherein the means to internally support the ends of the sleeves is a short adaptor tube having approximately the same external diameter as the normal internal diameter of said flexible sleeve.

14. The method of fabricating an electrical wiring assembly which comprises the steps of loosely placing two flexible sleeves around one or more conductors with the adjacent ends of said sleeves in spaced relation to each other, internally supporting the walls of the end portions of said sleeves, fitting a mold around said adjacent end portions of the sleeves and the portions of the conductors therebetween, filling the mold with a mobile plastic composition, such as plastisol, heating the mold and its contents until the plastic composition sets to a flexible self-sustaining solid, and removing the mold.

15. An electrical wiring assembly comprising a plurality of insulated conductors interconnected with at least one branch juncture, a plurality of flexible collapsible sleeves loosely surrounding said conductors except at said juncture, means to radially support only the end portions of said sleeves adjacent the juncture, and a solid self-sustaining molded mass embedding the insulated conductors and the supported ends of the sleeves at said juncture and sealing the end of the sleeves around the conductors.

16. An electrical wiring assembly as set forth in claim 15 including an assembly support member integral with one of said conductors comprising flexible collapsible sleeves loosely surrounding said conductor at each side of a support area, means to radially support only the end portions of said sleeves adjacent the support area, and a solid self-sustaining molded mass embedding the insulated conductor, the supported ends of the sleeves, and a portion of the support member and sealing the ends of the sleeves around the conductor.

17. An electrical wiring assembly as set forth in claim 15 including at least one contact terminal, means to support the end of the sleeve adjacent the contact terminal and a solid self-sustaining molded mass embedding the insulated conductor, the supported end of the sleeve and a portion of the contact terminal and sealing the end of the sleeve and the embedded portion of the terminal contact around the conductor.

18. The method of fabricating an electrical wiring assembly which comprises the steps of interconnecting a plurality of insulated conductors at a plurality of branch junctures, providing a plurality of contact terminals on said conductors, loosely placing a plurality of flexible sleeves around said conductors between said branch junctures and contact terminals, internally supporting the walls of only the end portions of said sleeves adjacent said branch junctures and contact terminals, fitting molds around the supported sleeve portions and the branch junctures and contact terminals, filling the molds with a mobile plastic composition, such as plastisol, heating the molds and their contents until the plastic composition sets to a flexible self-sustaining solid, and removing the molds.

References Cited in the file of this patent
UNITED STATES PATENTS

| | | |
|---|---|---|
| 1,987,918 | Waring et al. | Jan. 15, 1935 |
| 2,168,757 | Baillard et al. | Aug. 8, 1939 |
| 2,639,312 | Kerwin | May 19, 1953 |
| 2,716,623 | Tator | Aug. 30, 1955 |

FOREIGN PATENTS

| | | |
|---|---|---|
| 164,658 | Australia | Aug. 18, 1955 |